(No Model.)  3 Sheets—Sheet 1.

W. T. LINEBACK.
VEHICLE BRAKE.

No. 521,934. Patented June 26, 1894.

Witnesses.
J. Thomson Cross
P. W. Sommers

Inventor:
William T. Lineback,
By Geo. B. Farrington,
His Attorney.

(No Model.)

3 Sheets—Sheet 2.

W. T. LINEBACK.
VEHICLE BRAKE.

No. 521,934.

Patented June 26, 1894.

Witnesses.

Inventor.
William T. Lineback,

His Attorney.

THE NATIONAL LITHOGRAPHING COMPANY,
WASHINGTON, D. C.

(No Model.)  W. T. LINEBACK.  3 Sheets—Sheet 3.
VEHICLE BRAKE.

No. 521,934.  Patented June 26, 1894.

Witnesses.  Inventor.
J. Thomson Cross  William T. Lineback,
P. W. Sommers  By Geo. B. Gardinson,
His Attorney.

UNITED STATES PATENT OFFICE.

WILLIAM T. LINEBACK, OF CINCINNATI, OHIO, ASSIGNOR OF ONE-HALF TO GEORGE H. FENNELL, OF NEWPORT, KENTUCKY.

VEHICLE-BRAKE.

SPECIFICATION forming part of Letters Patent No. 521,934, dated June 26, 1894.

Application filed November 27, 1893. Serial No. 492,101. (No model.)

*To all whom it may concern:*

Be it known that I, WILLIAM T. LINEBACK, a citizen of the United States of America, residing at Cincinnati, in the county of Hamilton and State of Ohio, have invented certain new and useful Improvements in Vehicle-Brakes, of which the following is a specification.

My invention relates to improvements in vehicle brakes and is particularly adapted for use on street and railway cars.

The object of my invention is to provide a brake that may be easily and quickly applied and positive and effective in operation.

The invention consists in novel mechanism for applying the brakes and in the combination and arrangement of parts hereinafter described and claimed.

The brake and its operative mechanism is applicable to any vehicle or any class or style of cars, but I have illustrated it in the accompanying drawings as applicable to a truck of an ordinary street car.

Figure 1:
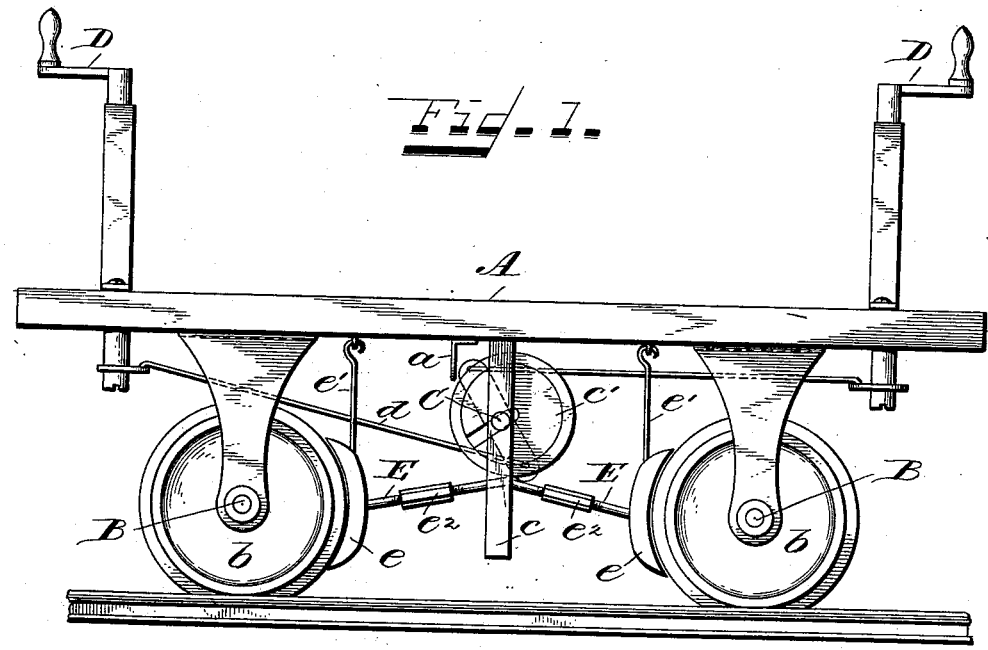
Figure 2:
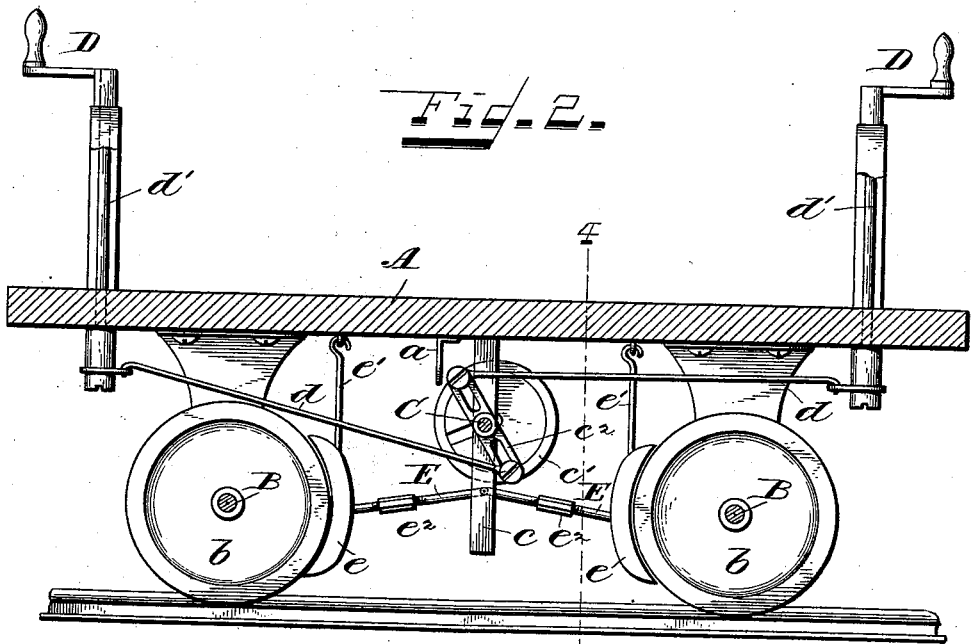
Figure 3:
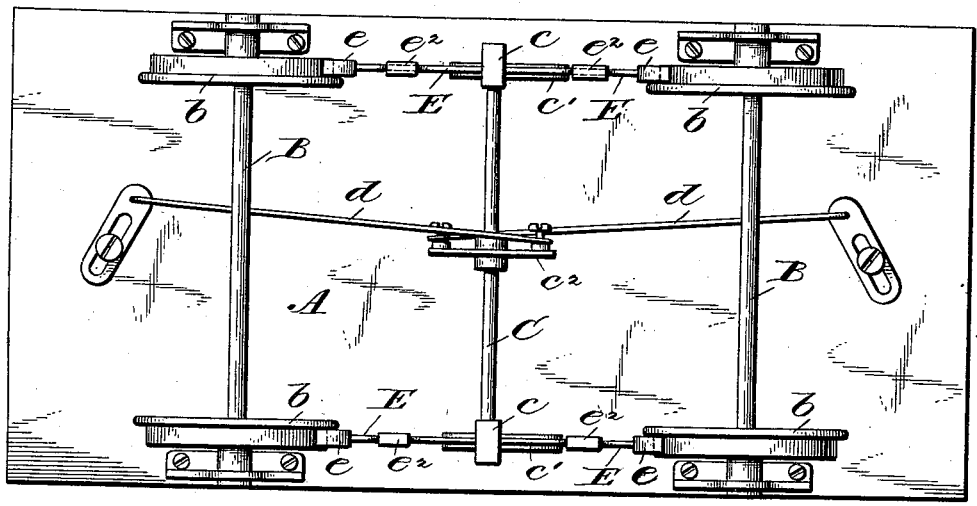
Figure 4:
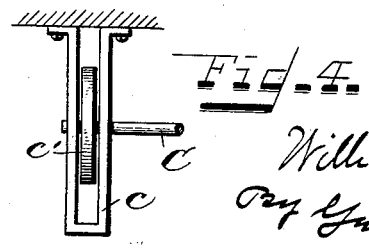
Figure 5:
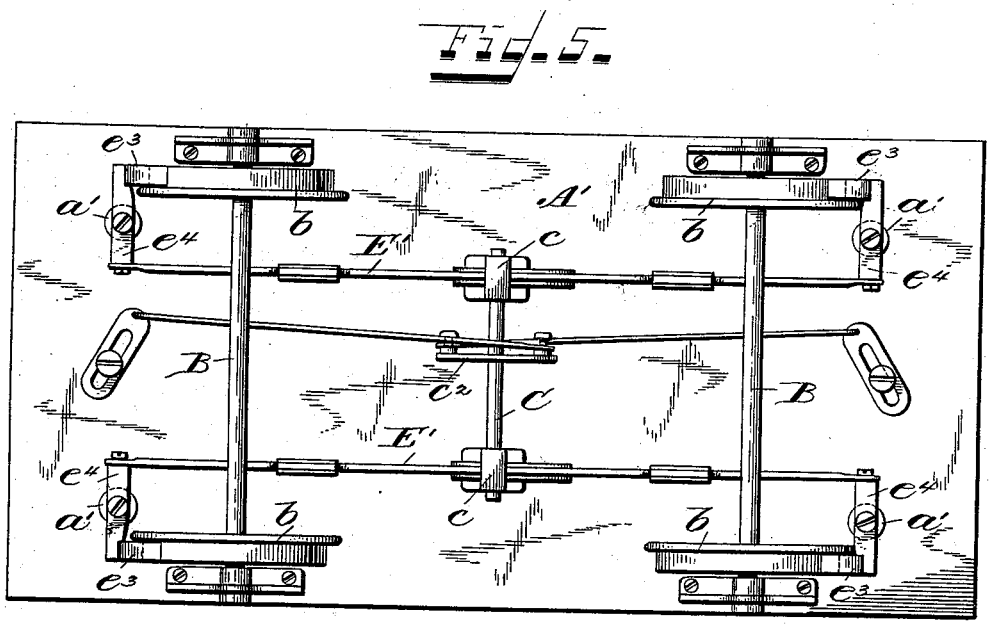
Figure 6:
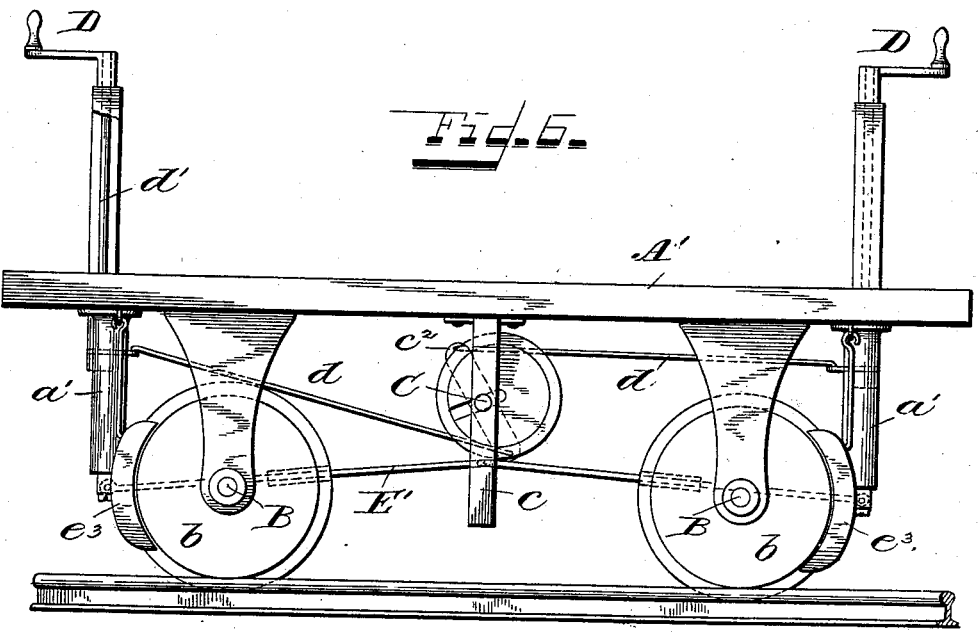

Figure 1 is a side elevation of a street car truck showing the brake shoes and brake operating levers mounted between the wheels. Fig. 2 is a vertical longitudinal section of the same. Fig. 3 is a bottom plan view of the same. Fig. 4 is a detail view of one of the guide plates. Fig. 5 is a bottom plan view showing a modified form of mounting the brake shoes and brake levers. Fig. 6 is a side elevation of the mechanism shown in Fig. 5.

A, designates a truck mounted on axles B carrying wheels $b$. Between the axles B is a shaft C mounted in bearings formed in guide plates $c$ depending from the truck. On each end of the shaft C in the guide plates, is mounted an eccentric $c'$. Between the eccentrics $c'$ is a yoke $c^2$ secured to, and adapted to rotate the axle through the medium of rods $d$ connected to crank-shafts $d'$ mounted at each end of the truck and adapted to be actuated by crank-arms D. The crank arms are limited in their movement by a stop $a$ which engages the yoke preferably at a point which limits the throw to a quarter revolution of the yoke.

E designates a jointed brake lever mounted in guide plates $c$ beneath the eccentric. On each end of the lever is pivotally mounted a brake shoe or block $e$ suspended from the truck by a link or rod $e'$, allowing the shoes to swing in an arc of a circle. The length of the brake lever is greater than the distance between the wheels where the brake shoes are applied, and it normally bends upward at the joint forming a fulcrum midway between the shoes upon which the eccentric bears. By actuating the eccentric the joint is pressed downward forcing the ends of the rod in opposite directions and pressing the brake shoes against the wheels.

The brake shoes are made adjustable for the purpose of changing the pitch to obtain a greater or less leverage and to permit adjustment to compensate for wear of the brake shoes. In the form shown, the sections of the lever on each side of the joint are divided and connected by a right and left threaded sleeve $e^2$.

In the modification shown in Figs. 5 and 6, the brake shoes $e^3$ are arranged to engage with the outer faces of the wheels instead of engaging with the inner and opposing faces as in Figs. 1 to 3. The brake shoes are carried by levers $e^4$ fulcrumed on hangers $a'$ depending from the truck A' in close proximity to the periphery of the wheels. The lever $e^4$ is connected to the jointed brake lever E' mounted beneath the eccentric in the guide plate, as above described. When the eccentric is brought to bear upon the joint of the lever, the ends connected to the lever $e^4$ are forced in opposite directions, forcing the brake shoes against the wheels.

What I claim is—

1. In a vehicle brake, the combination with a truck, of guide plates carried thereby, a shaft mounted in the guide plates, eccentrics on the shaft, and brake levers adapted to be actuated by the eccentrics, substantially as and for the purpose specified.

2. In a vehicle brake, the combination with a truck, of guide plates carried thereby, a shaft mounted in the guide plates, eccentrics on the shaft within the guide plates, and brake levers adapted to be actuated by the eccentrics, substantially as and for the purpose specified.

3. In a vehicle brake, the combination with a truck, of guide plates carried thereby, a shaft mounted in the guide plates, brake levers adapted to reciprocate in the guide plates, eccentrics adapted to actuate the brake levers, and means for actuating the eccentrics, substantially as and for the purpose specified.

4. In a vehicle brake, the combination with a truck, of guide plates carried thereby, a shaft mounted in the guide plates, jointed brake levers adapted to reciprocate in the guide plates, eccentrics adapted to actuate the brake levers, and means for actuating the eccentrics, substantially as and for the purpose specified.

5. In a vehicle brake, the combination with a truck, of guide plates carried thereby, a shaft mounted in the guide plates, eccentrics mounted on the shaft within the guide plates, brake levers adapted to reciprocate within the guide plates beneath the eccentrics, and means for actuating the eccentrics, substantially as and for the purpose specified.

6. In a vehicle brake, the combination with a truck, of guide plates carried thereby, a shaft mounted in the guide plates, eccentrics mounted on the shaft within the guide plates, jointed brake levers adapted to reciprocate between the guide plates beneath the eccentrics, a yoke on the shaft, and mechanism for operating the yoke, substantially as and for the purpose specified.

7. In a vehicle brake, the combination with a truck, of guide plates carried thereby, a shaft mounted in the guide plates, eccentrics mounted on the shaft within the guide plates, jointed brake levers adapted to reciprocate between the guide plates beneath the eccentric, a yoke mounted on and adapted to rotate the shaft, and crank-shafts for rotating the yoke, substantially as and for the purpose specified.

WILLIAM T. LINEBACK.

Witnesses:
JAMES N. RAMSEY,
B. W. SOMMERS.